United States Patent
Ricoul et al.

(10) Patent No.: US 8,293,193 B2
(45) Date of Patent: Oct. 23, 2012

(54) MICROFLUIDIC COMPONENT WITH A CHANNEL FILLED WITH NANOTUBES AND METHOD FOR ITS PRODUCTION

(75) Inventors: Florence Ricoul, Quaix-en-Chartreuse (FR); Nicolas Sarrut, Seyssinet Pariset (FR); Jean Dijon, Champagnier (FR); Francoise Vinet, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 823 days.

(21) Appl. No.: 11/918,664

(22) PCT Filed: May 11, 2006

(86) PCT No.: PCT/EP2006/004416
§ 371 (c)(1),
(2), (4) Date: Oct. 17, 2007

(87) PCT Pub. No.: WO2006/122697
PCT Pub. Date: Nov. 23, 2006

(65) Prior Publication Data
US 2009/0060788 A1   Mar. 5, 2009

(30) Foreign Application Priority Data
May 17, 2005   (FR) ...................................... 05 04919

(51) Int. Cl.
*B01J 19/00* (2006.01)
*C23C 16/00* (2006.01)

(52) U.S. Cl. ........ 422/503; 422/68.1; 210/503; 210/506; 216/39; 427/249.3; 428/36.9; 423/447.2; 423/447.3; 977/742

(58) Field of Classification Search .................. None
See application file for complete search history.

(56) References Cited

U.S. PATENT DOCUMENTS
7,290,667 B1 * 11/2007 Bakajin et al. ................ 210/503
(Continued)

FOREIGN PATENT DOCUMENTS
| EP | 1 520 622 A1 | | 4/2005 |
| WO | WO 2004/053464 | * | 6/2004 |
| WO | WO 2004/078348 | * | 9/2004 |
| WO | WO 2004/078348 A1 | | 9/2004 |

OTHER PUBLICATIONS

Cai, Ya-Qi et al., "Multi-walled Carbon Nanotubes Packed Cartridge for the Solid-phase Extraction of Several Phhalate Esters from Water Samples and their Determination by High Performance Liquid Chromatography," Analytica Chimica Acta, vol. 494 p. 149-156 (2003).
(Continued)

*Primary Examiner* — In Suk Bullock
*Assistant Examiner* — Timothy G Kingan
(74) *Attorney, Agent, or Firm* — Oliff & Berridge, PLC

(57) ABSTRACT

A microfluidic component comprises at least one channel (2) delineated by a top wall (6) and a bottom wall (3) and two opposite side walls (4, 5). The distance (P) between the top wall (6) and the bottom wall (3) of the channel (2) is greater than or equal to 25 micrometers and first and second sets of nanotubes (9a, 9b) are respectively borne by the two opposite side walls (4, 5) for the component to present a particularly high ratio between the contact surface and the available volume and a limited overall surface size. In addition, the distance between the two opposite side walls (4, 5) is about a few micrometers and preferably comprised between 3 and 5 micrometers.

14 Claims, 6 Drawing Sheets

U.S. PATENT DOCUMENTS

2002/0187564 A1* 12/2002 Chow et al. .................. 436/518
2003/0165418 A1* 9/2003 Ajayan et al. .............. 423/447.2
2004/0126890 A1 7/2004 Gjerde et al.
2004/0173506 A1 9/2004 Doktycz et al.
2006/0231494 A1* 10/2006 Lu et al. ........................ 210/656
2006/0264323 A1 11/2006 Dijon et al.

OTHER PUBLICATIONS

Stachowiak, Timothy B. et al., "Chip Electrochromatography," Journal of Chromatography A, vol. 1044, p. 97-111 (2004).

* cited by examiner

MICROFLUIDIC COMPONENT WITH A CHANNEL FILLED WITH NANOTUBES AND METHOD FOR ITS PRODUCTION

BACKGROUND OF THE INVENTION

The invention relates to a microfluidic component comprising at least one channel delineated by a top wall, a bottom wall and two opposite side walls, at least one of the walls of the channel bearing a plurality of nanotubes arranged substantially perpendicularly to said wall.

The invention also relates to a method for producing one such microfluidic component.

STATE OF THE ART

Microfluidic devices, also called fluidic microsystems, such as microreactors or microlabs better known as "μ-TAS" (micro Total Analysis System) or "Lab-on-a-chip", have really taken off over the past ten years for performing chemical or biological operations and/or analyses on very small volume samples.

It is however sought to integrate an increasing number of functions in these microfluidic devices. For example, it is desired to achieve microfluidic devices enabling several operations to be performed such as sample pre-processing, filtrations, mixtures, separations and/or detection. Such an integration does however require systems enabling ever increasing performances to be obtained in terms of miniaturization and/or efficiency. Moreover, it is known that the efficiency of a heterogeneous chemical or biological reaction or of a separation is all the greater the higher the ratio between the surface of the system in contact with the sample and the volume of sample flowing in said device, also called the S/V ratio.

The article "Chip electrochromatography" by Timothy B. Stachowiak et al. (Journal of Chromatography A, 1044 (2004) pages 97-111) discloses for example the different separation systems used up to now in μ-TAS. Thus, the article describes on-chip electrochromatography systems using open channels with modified walls serving as the stationary phase. The open channels are of micrometric dimensions and the S/V ratio is greater than in macroscopic systems. With this solution, the developed surface does however remain limited. The article also relates that the contact surface can be increased in a reduced volume by using for example channels filled with beads, for example silica-based beads.

Recent developments in the field of nanostructure synthesis processes, such as carbon nanotubes also called CNT or carbon nanofibers, open up new perspectives for developing the contact surface of microfluidic devices. Thus, the Patent application US-A1-2004/0126890 describes a device for separating and concentrating substances to be analyzed, such as biomolecules and biomolecule complexes. The device can thus comprise open capillary tubes, for example carbon nanotubes, to perform a solid-phase extraction operation.

There are two main types of carbon nanotubes synthesis processes.

The first type of process enables carbon nanotubes to be obtained from catalytic powders, leading to formation of independent carbon nanotubes, i.e. that are not affixed to a surface. Thus, the article by Ya-Qi Cai et al. ("Multi-walled carbon nanotubes packed cartridge for the solid-phase extraction of several phthalate esters from water samples and their determination by high performance liquid chromatography", Analytica Chimica Acta, 494 (2003), pages 149-156) relates the use of carbon nanotubes in a conventional cartridge for the solid-phase extraction. The carbon nanotubes used have a mean external diameter of 30 to 60 nm and they are previously fabricated before being inserted into the cartridge.

The second type of process enables the carbon nanotubes to be formed in situ, on a surface previously coated with a catalyst coating, the nanotubes then being arranged substantially perpendicularly to said surface. Thus, in the Patent application US-A1-2004/0173506, carbon nanotubes supported by one of the surfaces of a channel, and more particularly by the bottom of the channel, are used to form membranes controlling molecular transport. The carbon nanotubes are arranged substantially perpendicularly to the bottom of the channel and they form obstacles to the flow circulating in the channel. The carbon nanotubes are formed by a controlled growth process by means of a metallic catalyst. The growth process is for example a PECVD (Plasma Enhanced Chemical Vapor Deposition) type process. The position of the carbon nanotubes, on the bottom of the channel, is determined by the position of droplets of metallic catalyst previously formed on the bottom of the channel and from which the nanotubes grow. The catalyst used is for example nickel, cobalt or iron. The carbon nanotubes obtained by such processes do however present the drawback of having a length limited to a maximum of a few micrometers and more particularly to 2 or 3 micrometers. This does not enable a sufficiently high ratio to be obtained, in a channel as described in the Patent application US-A1-2004/0173506, between the contact surface and the available volume to efficiently process large quantities of sample.

OBJECTS OF THE INVENTION

It is one object of the invention to provide a microfluidic component remedying the shortcomings of the prior art. More particularly, it is one object of the invention to provide a microfluidic component comprising at least one channel delineated by a top wall, a bottom wall and two opposite side walls, at least one of the walls of the channel bearing a plurality of nanotubes arranged substantially perpendicularly to said wall, said component presenting a particularly high ratio between the contact surface and the available volume and a limited overall surface size.

According to the invention, this object is achieved by the appended claims, and more particularly by the fact that the distance between the top wall and the bottom wall being greater than or equal to 25 micrometers, first and second sets of nanotubes are respectively borne by the opposite side walls so as to fill said channel, and that the distance between the two opposite side walls is about a few micrometers.

It is a further object of the invention to provide a method for producing one such microfluidic component that is easy to implement and enables a microfluidic component to be obtained presenting a particularly high ratio between the contact surface and the available volume and a limited overall surface size.

According to the invention, this object is achieved by the fact that the method comprises at least the following successive steps:
selective etching of a substrate of predetermined thickness so as to form at least the opposite side walls of the channel,
and growth of the first and second sets of nanotubes on the opposite side walls of the channel.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
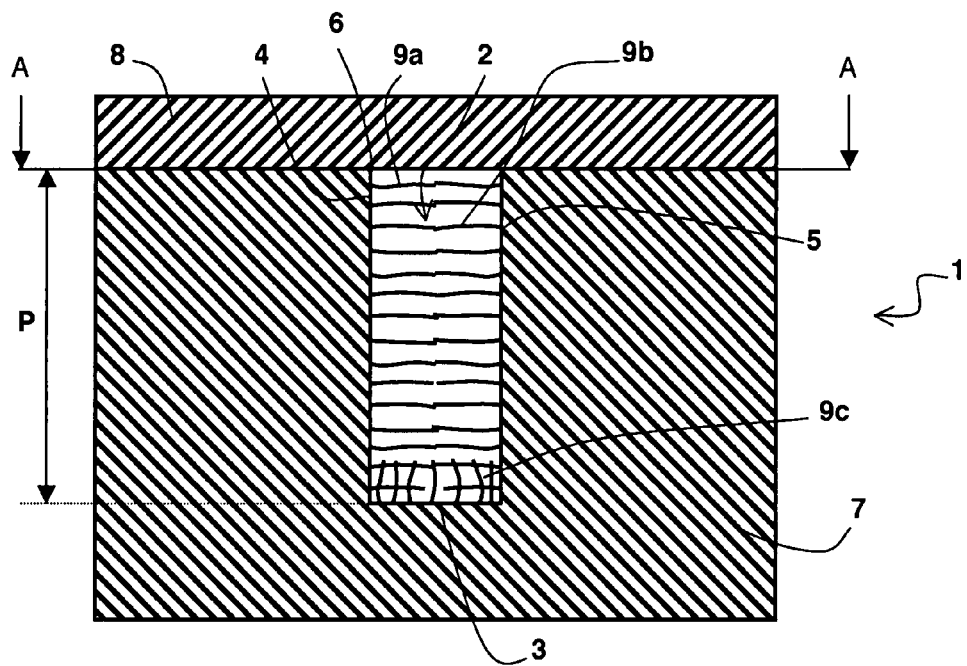
FIG. 1 schematically represents a particular embodiment of a microfluidic component according to the invention, in transverse cross-section.
Figure 2:
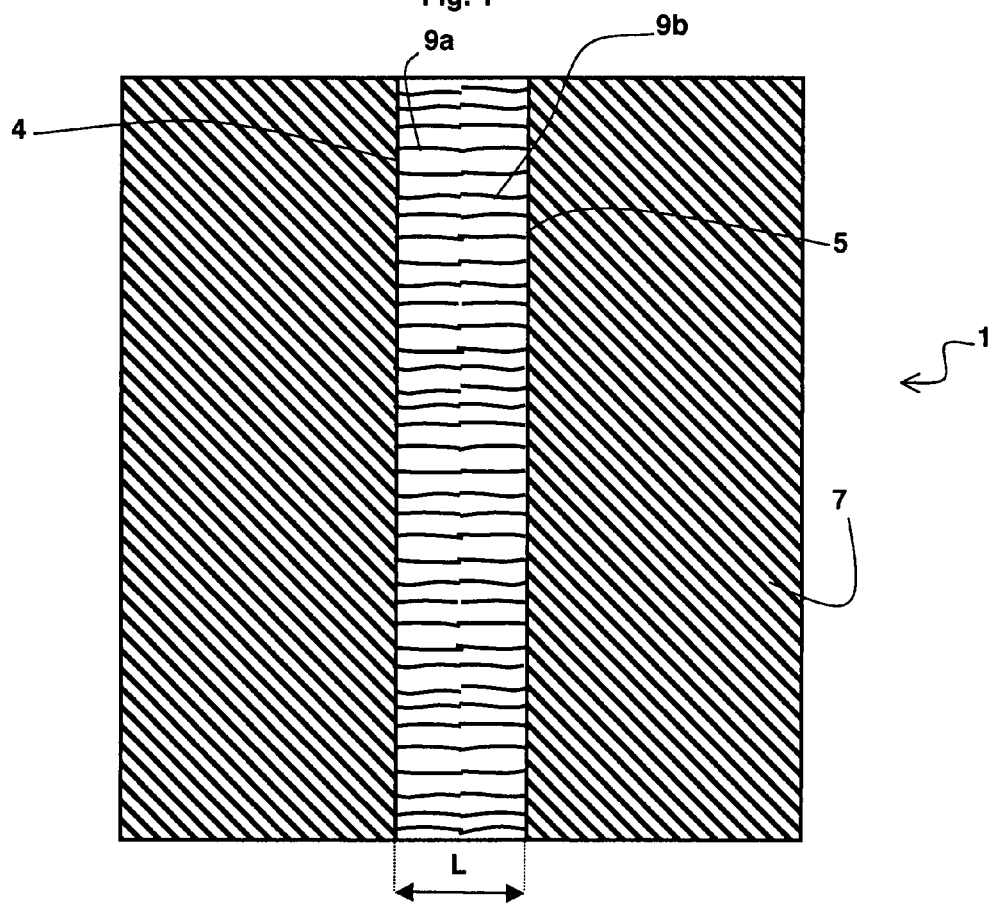
FIG. 2 represents the microfluidic component according to FIG. 1, in cross-section along A-A.

According to a particular embodiment represented in FIGS. 1 and 2, a microfluidic component 1, also called fluidic microsystem, comprises at least one channel 2 allowing flow of a fluid. The channel 2 is a closed channel, i.e. a channel comprising an inlet and an outlet for passage of said fluid, but delineated not only by a bottom wall 3 forming the bottom of the channel 2 and by two opposite side walls 4 and 5 but also by a top wall 6.

For example, the bottom wall 3 and the two opposite side walls 4 and 5 of the channel 2 are formed in a substrate 7, whereas the top wall 6 of the channel 2 is for example formed by a protective cover 8. The substrate 7 can be made of silicon, glass, quartz or plastic and the protective cover 8 is preferably sealed to the substrate 7 so as to obtain a closed and perfectly leaktight channel 2.

Moreover, the distance between the bottom wall 3 and the top wall 6, corresponding to the depth of the channel 2 and noted P in FIG. 1, is determined or chosen such as to be greater than or equal to 25 micrometers and preferably comprised between 25 and 100 micrometers. In addition, the distance between the two opposite side walls 4 and 5, corresponding to the width of the channel 2 and noted L in FIG. 2, is chosen such as to be about a few micrometers and preferably comprised between about 3 and about 5 micrometers and more particularly between 3 and 4 micrometers.

The two opposite side walls 4 and 5 of the channel 2 respectively bear on the surface thereof first and second sets of nanotubes 9a and 9b, preferably obtained by a growth process controlled by a metallic catalyst. More particularly, the nanotubes 9a and 9b of each set, which can for example be nanotubes containing carbon such as nanotubes made from carbon and from a metallic carbide, can be arranged on the whole of the surface of the side wall that bears them. They are arranged substantially perpendicularly to said wall. Thus, in FIGS. 1 and 2, the side walls are vertical walls and each set of nanotubes 9a or 9b is formed by a plurality of substantially parallel and horizontal nanotubes.

Moreover, in FIGS. 1 and 2, most of the free ends of the nanotubes 9a of the first set are in contact with the free ends of nanotubes 9b of the second set. The length of the nanotubes 9a and 9b is preferably less than or equal to 3 micrometers and it is more particularly about 2 to 3 micrometers. Thus, with a width L of channel 2 of about a few micrometers, more particularly between 3 and 4 micrometers, most of the nanotubes 9a of the first set, i.e. nanotubes borne by the side wall 4 in FIGS. 1 and 2, join the free ends of nanotubes 9b of the second set, i.e. nanotubes borne by the opposite side wall 5 in FIGS. 1 and 2. This enables the whole of the volume of the channel to be filled with a very large number of nanotubes, therefore enabling a particularly high ratio between the contact surface of the channel and the volume available inside the channel to be obtained.

Figure 3:
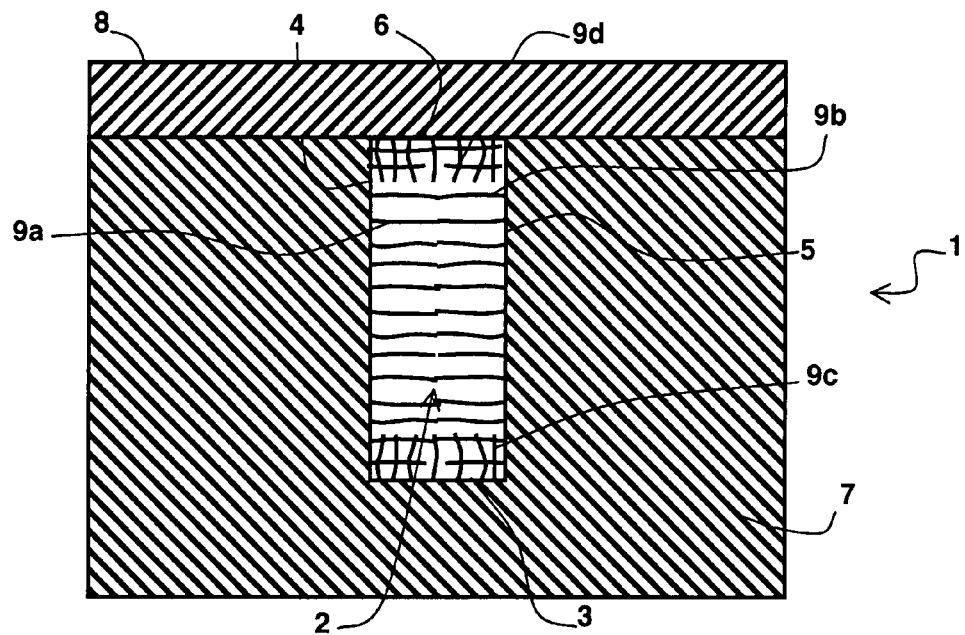
FIG. 3 schematically represents a first alternative embodiment of the microfluidic component according to FIG. 1, in transverse cross-section.

At least one of the top 6 or bottom 3 walls can also bear an additional set of nanotubes on the surface thereof. Thus, in FIG. 1, the bottom wall 3 of the channel 2 bears an additional set of nanotubes 9c, on the whole of its surface, the nanotubes being arranged substantially perpendicularly to said bottom wall 3. In FIG. 1, the nanotubes 9c are substantially parallel to one another and they are vertical. In another alternative embodiment represented in FIG. 3, the top wall 6 also comprises an additional set of nanotubes 9d, such that, in this case, the walls of the channel 2 bear nanotubes substantially perpendicularly to said corresponding walls. Thus, the channel 2 is completely filled with nanotubes, over the whole cross-section thereof. Furthermore, the length of the nanotubes 9c and/or 9d is substantially identical to those of the nanotubes 9a and 9b borne by the walls 4 and 5.

The fact that the space delineated by the channel is filled with nanotubes enables a microfluidic component to be obtained presenting a much higher surface over volume ratio than microfluidic components according to the prior art, not filled with nanotubes. The efficiency of the component can thus be improved obtaining for example a reduction of the reaction or analysis time, of the dispersion, of the dead volumes, of the sample quantities required. In addition, on account of the geometry of the channels and more particularly of the size of the channels, a very large number of channels can also be integrated on a single microfluidic component while keeping a limited overall surface size, unlike the channels as described in the Patent application US-A1-2004/0173506. Thus, for comparison purposes, a component according to the invention, with a cross-section of 100×100 µm², can contain 25 channels, with a lateral dimension of a few hundred micrometers whereas an equivalent component but comprising channels as described in the Patent application US-A1-2004/0173506 would present a lateral dimension of more than 3000 µm. Finally, for the same sample volume, implantation, in a microfluidic component, of a channel as described in the Patent application US-A1-2004/0173506 will require the use of a planar surface 30 to 50 times larger than a channel presenting a depth greater than or equal to 25 µm.

Moreover, the channel(s) 2 of the microfluidic component can have any type of geometry. In addition, their inlet can be connected to a fluid dividing zone, itself connected to an inlet channel, whereas their outlet can be connected to a fluid collection zone, itself connected to an outlet channel.

Figure 4:
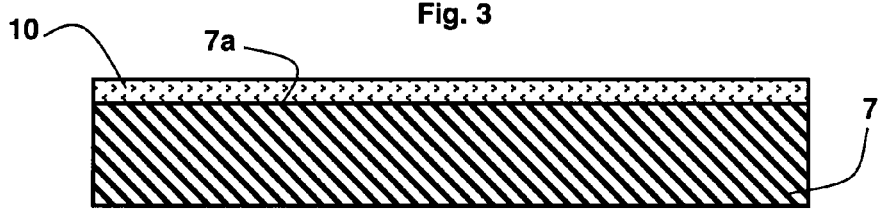
FIGS. 4 to 11 schematically represent the different steps of production of the microfluidic component according to FIG. 1, in transverse cross-section.
Figure 5:
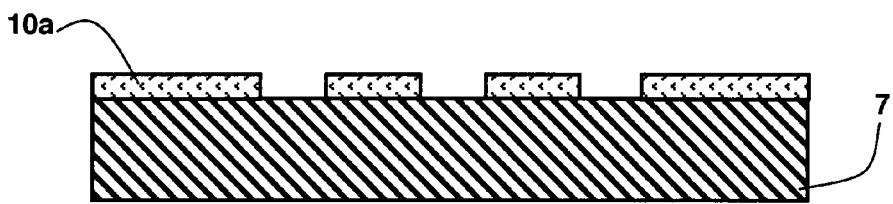
Figure 6:
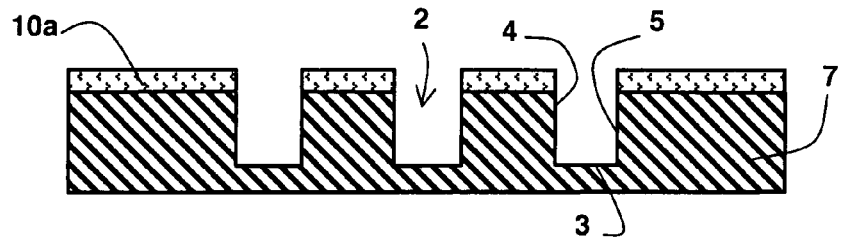

The channel(s) 2 of a microfluidic component such as the one represented in FIGS. 1 and 2 can be produced by a selective etching step in a substrate 7. Thus, as represented in FIGS. 4 to 11, three channels 2 are formed in a is silicon substrate 7. The substrate 7 has for example a thickness of about 450 micrometers. To perform selective etching, the free surface 7a of the substrate 7 is covered by a photoresist layer 10 (FIG. 4), then the layer 10 is patterned in the form of patterns 10a by photolithography (FIG. 5). Thus, the patterns 10a are formed by exposing the layer 10 by UV radiation through a mask (not represented) and then eliminating the exposed zones of the layer 10. The substrate 7 then undergoes a deep etching step (FIG. 6) for example by Deep Reactive Ion Etching (DRIE). The etching step is called selective in so far as etching of the substrate is performed only at the level of the areas of the substrate 7 that are not covered by the patterns 10a. The etching depth is also determined such as to obtain channels having a predetermined depth P. Thus, according to the particular embodiment represented in FIGS. 4 to 10, etching is performed over a strictly smaller depth than the thickness of the substrate and preferably over a depth comprised between 25 and 100 micrometers. This etching step thus enables the side walls 4 and 5 and the bottom wall 3 of the channels 2 to be formed in the substrate 7 (FIG. 6).

Figure 7:
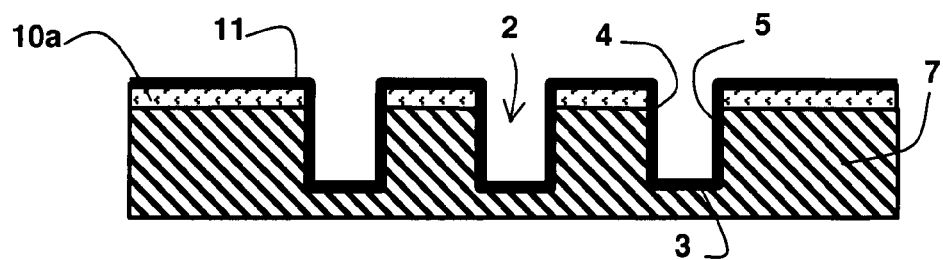

Then, as represented in FIG. 7, a metallic catalyst deposition step is then performed. The free surface of the patterns 10a, the side walls 4 and 5 and the bottom wall 3 of each channel 2 are thus covered with a layer 11 of metallic catalyst of uniform thickness, for example 10 nm. Deposition of the catalyst layer 11 can be performed by chemical evaporation or sputtering, by electrolytic deposition or by chemical deposition. In addition, the metallic material used to form the catalyst is more particularly chosen from iron, cobalt, nickel or an alloy of these metals.

Figure 8:
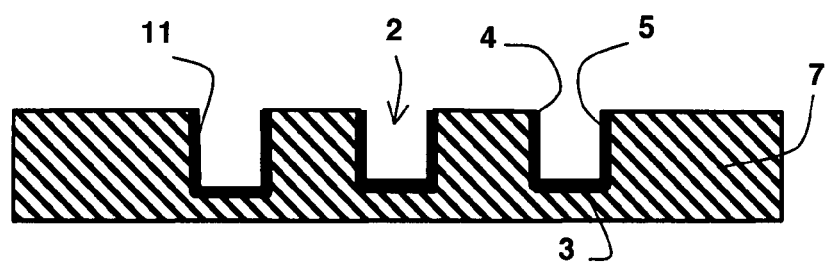
Figure 9:
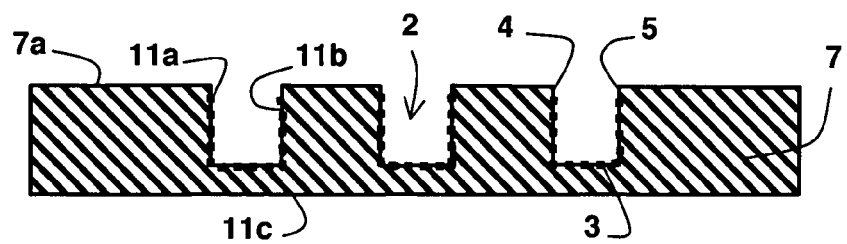

The patterns 10a and the portions of the catalyst layer 11 supported by said patterns 10a are then eliminated. In this way, only the side walls 4 and 5 and the bottom wall 3 of each channel 2 are covered, on their surface, by the layer 11 (FIG. 8). The layer 11 then undergoes an annealing step for one hour at a temperature for example comprised between 500° C. and 600° C. so as to fractionate the layer 11 and to form a plurality of droplets of catalyst acting as seeds for growth of carbon nanotubes. The side walls 4 and 5 and the bottom wall 3 of each channel 2 then comprise droplets of catalyst, respectively noted 11a, 11b and 11c (FIG. 9), on their surface.

Figure 10:
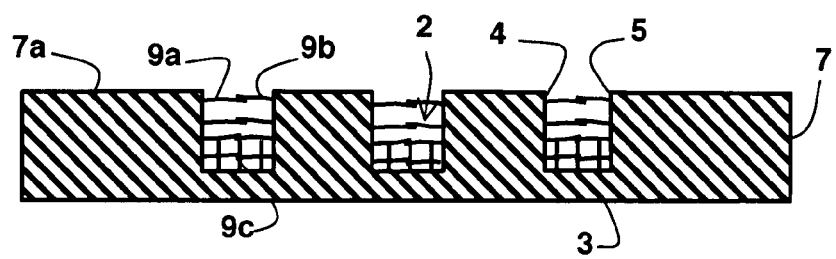

Three sets of carbon nanotubes, respectively 9a, 9b and 9c, are then formed by growth, respectively from the droplets 11a, 11b and 11c in a single thermal cycle (FIG. 10). Growth of the nanotubes, substantially perpendicularly to the respective walls 4, 5 and 3, can be achieved by means of chemical vapor deposition (CVD) using acetylene as carbon source. The position of the nanotubes is therefore determined by the location of the catalyst layer remaining after the photoresist layer patterns 10a have been eliminated and, more particularly, by the location of the droplets of catalyst formed on the walls of a channel. Most of the nanotubes 9a can then be made to join the nanotubes 9b as represented in FIG. 10. In addition, only the walls of the channels 2 bear carbon nanotubes, the surface of the substrate 7 previously covered by the patterns 10a remains blank.

Figure 11:
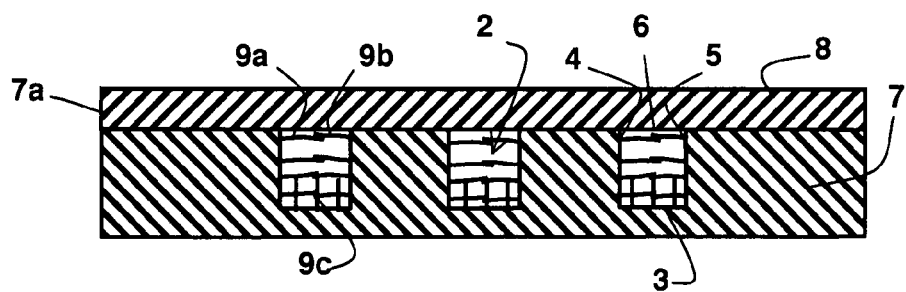

As represented in FIG. 11, once the channels 2 have been filled with carbon nanotubes 9a, 9b and 9c, a protective cover 8, for example made of glass or silicon, is arranged on the free surface 7a of the substrate 7 and is sealed, for example by molecular sealing forming Si—Si or Si-Glass bonds or by sealing by screen printing. This enables closed and perfectly leaktight channels 2 to be obtained.

A subsequent cutting step can then be performed to form microreactors each provided with one or more channels 2 completely filled with carbon nanotubes.

Figure 12:
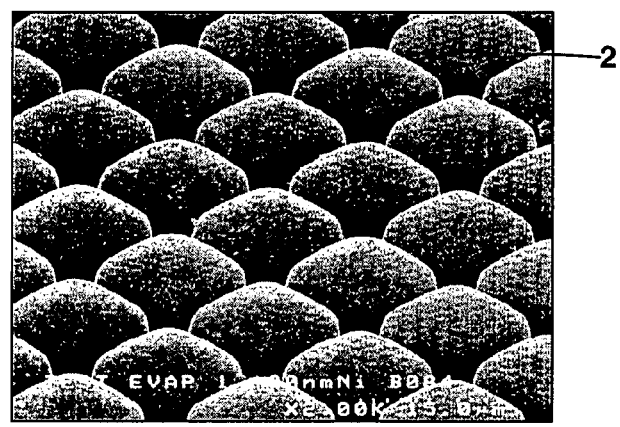
FIGS. 12 to 14 represent different steps of production as represented in FIGS. 4 to 11, in the form of images obtained by scanning electron microscopy.
Figure 13:
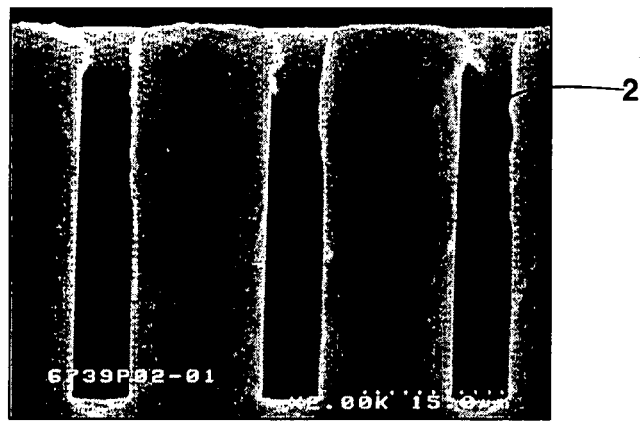
Figure 14:

For example, a network of channels 2 each having a width L of about 5 μm and a depth P of 30 μm were produced in a substrate such as a silicon wafer. As represented in FIGS. 4 to 6, the channels are achieved by photolithography and by deep reactive ion etching (DRIE). The surface of the substrate then undergoes a thermal oxidation step so as to form an oxide layer with a thickness of 2 to 3 micrometers on the surface of the substrate. As represented in FIG. 7, a deposition step is then performed to cover the whole of the surface of the substrate, and more particularly the parts forming the walls of the channels, with a layer of nickel with a thickness of 100 nm. The layer of nickel is for example deposited by chemical evaporation. For illustration purposes, the wafer with the network of channels 2 was observed by scanning electron microscopy, after the nickel layer deposition step (FIGS. 12 and 13). The set is then subjected to a thermal annealing step for 20 minutes at a temperature of 550° C. and in a hydrogen atmosphere at 0.2 bar so as to fractionate the nickel layer and form the nickel droplets. Growth of the carbon nanotubes is then performed at 554° C., for one minute, with a mixture of acetylene (27 sccm) and helium (80 sccm) at 0.4 mbar. FIG. 14 represents the channels 2 filled with carbon nanotubes 9 after the growth step.

In a first alternative embodiment, the catalyst deposition step can be preceded by a deposition step of a thin anti-diffusion or barrier layer, for example made of titanium nitride or of tantalum nitride and arranged between the catalyst layer 11 and the substrate 7. Moreover, the density of the catalyst droplets formed by the annealing step and therefore the number of carbon nanotubes subsequently formed can be controlled in conventional manner by etching the catalyst layer 11. For example, the density of the catalyst droplets can be controlled by etching such as that described in the Patent application WO-A-2004/078348.

Figure 15:
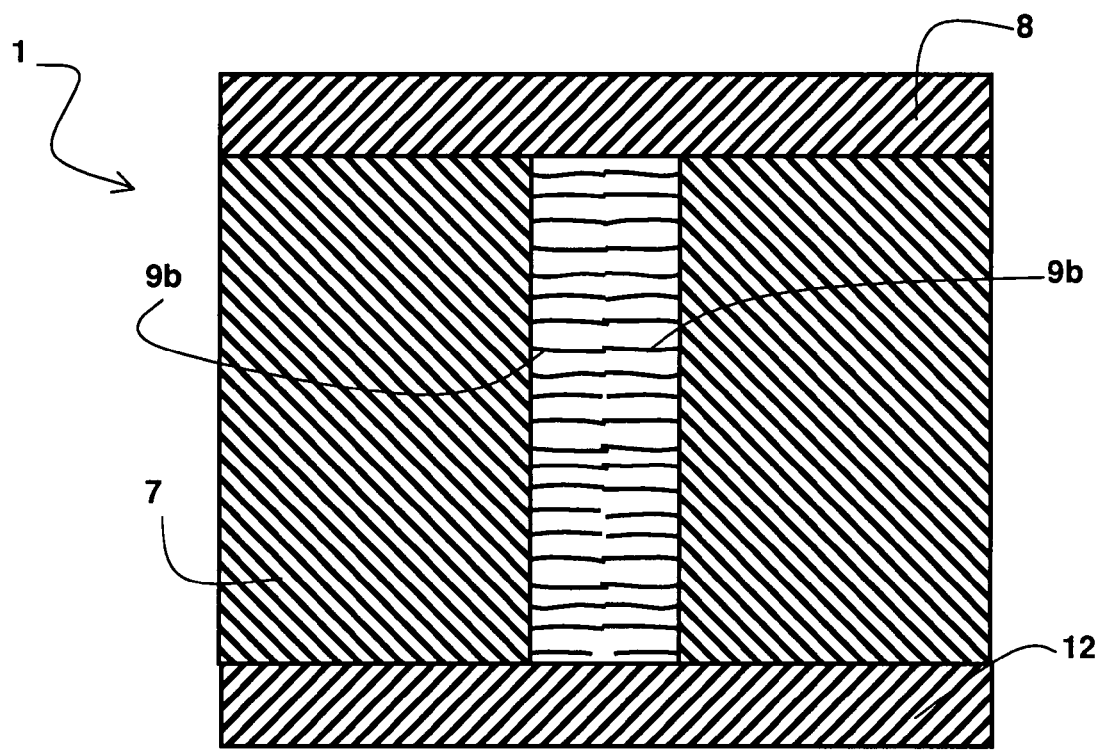
FIG. 15 schematically represents a second alternative embodiment of the microfluidic component according to FIG. 1, in transverse cross-section.

In a second alternative embodiment and as represented in FIG. 15, etching of the substrate 7 can be performed to a depth equal to the thickness of the substrate, which is more particularly more than 25 micrometers and preferably comprised between 25 and 100 micrometers. In this case, etching of the substrate only forms the two opposite side walls 4 and 5 of the channel 2. The bottom wall 3 of the channel 2 is formed later, preferably after growth of the first and second sets of nanotubes, by means of an additional protective cover 12 sealed to the substrate 7 on the opposite from the protective cover 8.

Such a method of production enables a microfluidic component presenting a particularly high surface over volume ratio and a limited overall surface size to be obtained directly and easily, by completely filling the space delineated by the nanotube channel. Such a method is in fact easier to implement than methods involving filling steps with beads or particles, grafting steps or chemical monolith synthesis steps. Furthermore, such a method presents the advantage of being compatible with the techniques used for collectively processing the dies of a complete silicon wafer.

The invention is not limited to the embodiments described above. For example, the nanotubes can undergo a treatment designed to functionalize their surface. They can for example be covered by a platinum deposit so as to obtain a microfluidic component serving the purpose of complete oxidation of carbon monoxide into carbon dioxide, by oxygen at low temperature. An enzyme such as trypsin can also be grafted onto the nanotubes, so as to obtain a microfluidic component or a microreactor for digesting proteins before the latter are analyzed. Finally, the nanotubes can be used as stationary phase support for chromatography. The surface of the nanotubes can then remain bare or it can be functionalized by grafting for example chemical molecules or charged molecules, before the nanotubes are used as stationary phase for chromatography.

Figure 16:
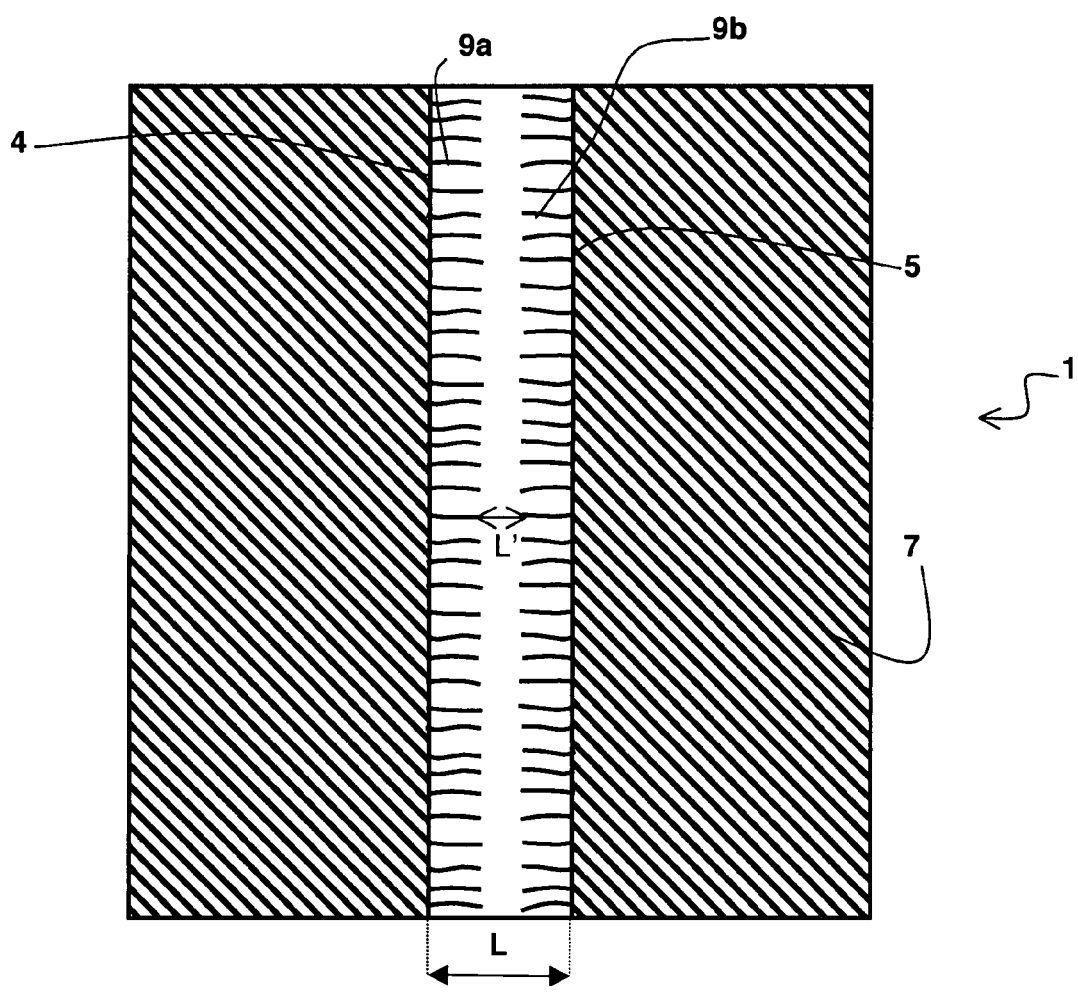
FIG. 16 represents another embodiment of a microfluidic component according to the invention, in cross-section.

In addition, in certain embodiments and as represented in FIG. 16, it is not always useful for the free ends of the nanotubes 9a of the first set formed on the side wall 4 to be in contact with the free ends of the nanotubes 9b of the second set formed on the wall 5. In this case, the channel 2 comprises a free space 13 delineated by the free ends of the nanotubes and located in the centre of the channel 2. The space 13 presents a width L' of less than 2 micrometers and corresponding to the mean distance separating the free ends of the nanotubes 9a and those of the nanotubes 9b. Although the channel 2 comprises a free space 13, the component keeps a particularly high ratio between the contact surface and available volume in so far as the channel presents a small width L', in a channel also of small width L (for example between 3 and 5 micrometers). The nanotube growth step parameters can be controlled so that most of the nanotubes formed on a side wall of a channel do not come into contact with those formed on the opposite side wall of said channel. Thus, in the example mentioned above, by lowering the temperature of the growth step from 554° C. to 500° C. and/or by performing the growth step in 30 seconds instead of one minute, a space free of nanotubes can be freed in the centre of each channel.

The invention claimed is:

1. A microfluidic component comprising at least one channel delineated by a top wall, a bottom wall and two opposite side walls,
wherein a distance between the top wall and the bottom wall is greater than or equal to 25 micrometers, and a distance between the two opposite side walls is about a few micrometers,
first and second sets of nanotubes are respectively borne by the opposite side walls, the opposite side walls each comprising a plurality of droplets of metal catalyst acting as seeds for growth of nanotubes so that most free ends of the nanotubes of the first set are in contact with free ends of the nanotubes of the second set so as to fill said channel, and the nanotubes have a length less than or equal to 3 micrometers.

2. The component according to claim 1, wherein the distance between the two opposite side walls is between about 3 and about 5 micrometers.

3. The component according to claim 1, wherein the distance between the top and bottom walls of the channel is between 25 and 100 micrometers.

4. The component according to claim 1, wherein at least one additional set of nanotubes is borne by one of the top and bottom walls.

5. The component according to claim 1, wherein the nanotubes contain carbon.

6. The component according to claim 1, wherein the first and second sets of nanotubes are ordered.

7. The component according to claim 1, wherein the metal catalyst is selected from the group consisting of iron, cobalt, nickel and an alloy thereof.

8. The component according to claim 1, wherein the channel has a volume that is wholly filled by nanotubes.

9. A method for producing a microfluidic component according to claim 1, comprising at least the following successive steps:
selective etching of a substrate of predetermined thickness so as to form at least the opposite side walls of the channel, and
growth of the first and second sets of nanotubes on the opposite side walls of the channel from a plurality of droplets of metal catalyst arranged on the opposite side walls.

10. The method according to claim 9, wherein etching of the substrate is performed to a depth equal to the thickness of the substrate and the top wall and the bottom wall of the channel are respectively formed by first and second protective covers respectively sealed onto the substrate.

11. A method according to claim 9, wherein etching of the substrate is performed over a strictly smaller depth than the thickness of the substrate to form, in the substrate, the bottom wall of the channel, the top wall of the channel being subsequently formed by a protective cover sealed onto the substrate.

12. The method according to claim 9, wherein the plurality of droplets of metal catalyst is arranged on the opposite side walls by a metal catalyst deposition step followed by an annealing step.

13. The method according to claim 9, wherein the nanotubes contain carbon and the growth of the first and second sets of nanotubes is obtained in a single thermal cycle by chemical vapor deposition using acetylene as a carbon source.

14. The method according to claim 9, wherein the metal catalyst is selected from a group consisting of iron, cobalt, nickel and an alloy thereof.

* * * * *